United States Patent
Savinov

(10) Patent No.: US 8,088,258 B2
(45) Date of Patent: Jan. 3, 2012

(54) METHOD FOR PURIFYING AND SEPARATING A KRYPTON-XENON MIXTURE BY RECTIFICATION AND A DEVICE FOR CARRYING OUT SAID METHOD

(76) Inventor: Mikhail Jurievich Savinov, Moscow (RU)

( * ) Notice: Subject to any disclaimer, the term of this patent is extended or adjusted under 35 U.S.C. 154(b) by 669 days.

(21) Appl. No.: 12/087,223

(22) PCT Filed: Dec. 26, 2006

(86) PCT No.: PCT/RU2006/000699
§ 371 (c)(1),
(2), (4) Date: Jan. 5, 2009

(87) PCT Pub. No.: WO2007/078212
PCT Pub. Date: Jul. 12, 2007

(65) Prior Publication Data
US 2009/0188278 A1     Jul. 30, 2009

(30) Foreign Application Priority Data
Dec. 29, 2005  (RU) ............................... 2005141204

(51) Int. Cl.
*F25J 3/08* (2006.01)
*C01B 23/00* (2006.01)

(52) U.S. Cl. ............ 203/71; 202/154; 202/155; 62/617; 62/925

(58) Field of Classification Search .................. 423/262; 95/90, 148; 96/108, 243; 62/600, 617, 925; 202/153–155; 203/71; 976/DIG. 381
See application file for complete search history.

(56) References Cited

U.S. PATENT DOCUMENTS

| | | | | |
|---|---|---|---|---|
| 2,040,116 A * | 5/1936 | Schlitt et al. | .................... | 62/648 |
| 4,078,907 A * | 3/1978 | Schlea | ............................ | 95/173 |
| 4,270,938 A * | 6/1981 | Schmidt et al. | ................. | 62/600 |
| 4,574,006 A * | 3/1986 | Cheung | ........................... | 62/648 |
| 5,122,173 A * | 6/1992 | Agrawal et al. | ................. | 62/648 |
| 6,351,970 B1 | 3/2002 | Hahn et al. | | |
| 6,612,129 B2 | 9/2003 | Schwenk | | |
| 7,516,627 B2 * | 4/2009 | Savinov | ........................ | 62/644 |
| 7,922,875 B2 * | 4/2011 | Kambe et al. | ..................... | 203/5 |
| 8,016,981 B2 * | 9/2011 | Savinov et al. | ................. | 203/71 |

FOREIGN PATENT DOCUMENTS

| | | |
|---|---|---|
| RU | 2242267 | 12/2004 |
| RU | 2047062 | 10/2005 |
| RU | 2265778 | 12/2005 |

* cited by examiner

*Primary Examiner* — Frank Lawrence, Jr.
(74) *Attorney, Agent, or Firm* — Aleksandr Smushkovich

(57) ABSTRACT

The invention relates to cryogenic engineering, in particular to purifying krypton-xenon mixture and is usable in the chemical and oil-and-gas industries. The inventive method comprises purifying and separating the mixture in rectification columns, wherein coolant is removed and returned to a cooling cycle, additionally removing radionuclides from krypton and xenon fractions and from krypton and xenon production flows by means of filtration and/or adsorption and/or rectification and/or absorption and/or chemical and/or physicochemical methods in apparatuses for additional removing radionuclides. Balloons for reception of the separated products are certified with respect to radionuclides content and/or activity prior to and after the filling thereof. An installation for carrying out the method is also disclosed, allowing to additionally remove radionuclides from the separated products in such a way that the products can be used, for example, for medical purposes and to increase the cost efficiency of purification and separation processes.

7 Claims, 2 Drawing Sheets

METHOD FOR PURIFYING AND SEPARATING A KRYPTON-XENON MIXTURE BY RECTIFICATION AND A DEVICE FOR CARRYING OUT SAID METHOD

CROSS-REFERENCE TO RELATED APPLICATIONS

This application is a U.S. national phase application of a PCT application PCT/RU2006/000699 filed on 26 Dec. 2006, published as WO2007/078212, whose disclosure is incorporated herein in its entirety by reference, which PCT application claims priority of a Russian Federation patent application RU2005/141204 filed on 29 Dec. 2005.

FIELD OF THE INVENTION

The invention relates to cryogenic engineering. More specifically, the invention pertains to refining and separating a krypton-xenon mixture obtained at air-fractionating installations, and can be used in chemical, oil, and gas producing industries.

BACKGROUND ART AND OBJECT OF THE INVENTION

Known in the art is a method for refining and separating a krypton-xenon mixture by rectification including: delivering the mixture in a preliminary separation column to form a krypton fraction and a xenon fraction, purifying each fraction by rectification to remove volatile and high-boiling components with the formation of a phlegm in evaporating condensers, due to the boiling of liquid coolant coming from a storage and from a cooling cycle, reception and pumping a production krypton and xenon in the cylinders (patent RU 22265778, 2005).

The known method does not allow clearing production krypton and xenon from radionuclides, for example, from products of the radioactive decay of radon, contained in an initial mixture, and also this method is rather expensive.

BRIEF DESCRIPTION OF THE INVENTIVE METHOD

An object of the invention is to obtain krypton and xenon, cleared from radionuclides, for their use, for example, in the medicine and in order to enhance the efficiency.

The object is achieved by providing an inventive method for purifying and separation a krypton-xenon mixture by rectification. The inventive method comprises: supplying a krypton-xenon mixture into a rectification column of preliminary separation of the mixture into krypton and xenon fractions, the column including an evaporator-condenser in its lower region and a still (also known as a 'cube') in its upper region, each said evaporator-condenser including an additional evaporator; purifying each fraction by rectification to remove volatile and high-boiling components with the formation of a phlegm in evaporators-condensers of a column of production krypton and a column of production xenon respectively due to the boiling of liquid coolant coming from a storage and from a cooling cycle; obtaining and pumping production krypton and xenon into balloons; wherein the method being characterized in that before the step of supplying the mixture into the column of preliminary separation into krypton and xenon fractions, the mixture is additionally cleared from radionuclides at an additional apparatus for clearing the mixture from radionuclides, then the flows of the krypton and xenon fractions are additionally cleared from radionuclides accordingly at an additional apparatus of clearing the krypton fraction from radionuclides and at an additional apparatus of clearing the xenon fraction from radionuclides with the control over content and/or activity of radionuclides therein.

The xenon fraction is removed from a still of the preliminary separation column mainly in the vapor form; the production flows of krypton and xenon are additionally cleared from radionuclides before passing them onto filling ramps accordingly in the apparatus finish clearing of production krypton and in the apparatus of finish clearing of production xenon. During the pumping of the production flows into balloons, the flows are additionally tested on the radionuclides content and/or activity. Compressed coolant is retrieved from the cooling cycle, and thereafter is cooled off in the evaporators of stills of the rectification columns. The coolant is then returned into the cooling cycle.

In a preferred embodiment of the invention, the clearing of the krypton fraction in the additional apparatus for clearing the krypton fraction from radionuclides and the clearing of the xenon fraction in the additional apparatus for clearing the xenon fraction from radionuclides are carried out by a rectification method, whereas the clearing of the mixture in the additional apparatus for clearing the mixture from radionuclides, the clearing of the production krypton flow in the finish apparatus for clearing of the production krypton and the clearing of the production xenon in the finish apparatus for clearing of the production xenon are carried out by a filtration and/or absorption and/or adsorption and/or chemical and/or physicochemical methods. The above-mentioned apparatuses are thermostated (i.e. the internal temperature is maintained in a predetermined range), the balloons are additionally cleaned and certified with respect to the radionuclides content and/or activity, before pumping the production krypton and xenon.

BRIEF DESCRIPTION OF THE INVENTIVE INSTALLATION

Known is a device for purifying and separation of a krypton-xenon mixture by means of rectification, comprising a mixture feed line, which is connected to a column of preliminary separation of the mixture into krypton and xenon fractions; a column of production krypton connected to the last line of the krypton fraction; and a column of production xenon connected to a line of the xenon fraction, a refrigerating cycle connected with evaporators-condensers of the columns by means of pipelines and valves; the lines of production flows of krypton and xenon with filling ramps placed on them (patent RU2265778, 2005).

The known installation does not allow to clear production krypton and xenon from radionuclides, for example, from products of the radioactive decay of radon, contained in the initial mixture, and also is of poor efficiency.

A purpose of the invention is the production of production krypton and xenon, cleared from radionuclides, for their use, for example, in medicine. Another purpose of the invention is to increase efficiency of the production process.

The object of the invention is achieved by means of an inventive device (further called 'installation') for purifying and separation of a krypton-xenon mixture through rectification, which installation comprises a feed line for supply of the mixture; a column of preliminary separation of the mixture into krypton and xenon fractions connected to the feed line, the preliminary separation column includes a still situated in the lower portion of the column; a column of production krypton, connected to the preliminary separation column via a krypton fraction line, the production krypton column includes condensers-evaporators situated in the upper portion of the column; a column of production xenon, connected to the preliminary separation column via a xenon fraction line, the production xenon column includes condensers-evaporators situated in the upper portion of the column; a cooling cycle connected with the aforesaid condensers-evaporators of the krypton and xenon production columns by means of pipelines and valves;

lines of production flows of krypton and xenon with filling ramps placed on them; wherein the distinctive feature of the inventive installation is that an additional apparatus for cleaning the mixture with a thermostat system is installed on the feed line, an additional apparatus for cleaning the krypton fraction from radionuclides and/or an additional rectification column for cleaning the krypton fraction from radionuclides is/are mounted on the krypton fraction line before the krypton production column;

an additional apparatus for cleaning the xenon fraction from radionuclides and/or an additional rectification column for cleaning the xenon fraction from radionuclides is/are mounted on the xenon fraction line before the xenon production column;

an apparatus for finish clearing the production krypton and an apparatus for finish clearing the production xenon are respectively installed on the lines of production flows of krypton and xenon before the filling ramps;

the still of the preliminary separation column is furnished with an additional line for retrieval of the xenon fraction in the vapor form, the columns, lines of production flows of krypton and xenon with filling ramps are additionally furnished with control units and units for testing the radionuclides content and/or activity, wherein the stills of all the columns are furnished with additional evaporators placed in the stills, each aforesaid evaporator having an input and an output both connected to the cooling cycle, and the additional apparatus for finish clearing the production krypton and xenon each comprising subsequently placed a discharge impeller, an entrance filtering element, an active cleaning element, and an exit filtering element.

DESCRIPTION OF THE DRAWINGS OF THE PRESENT INVENTION

The invention is illustrated by means of drawings, wherein.

DESCRIPTION OF THE PREFERRED EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

Figure 1:
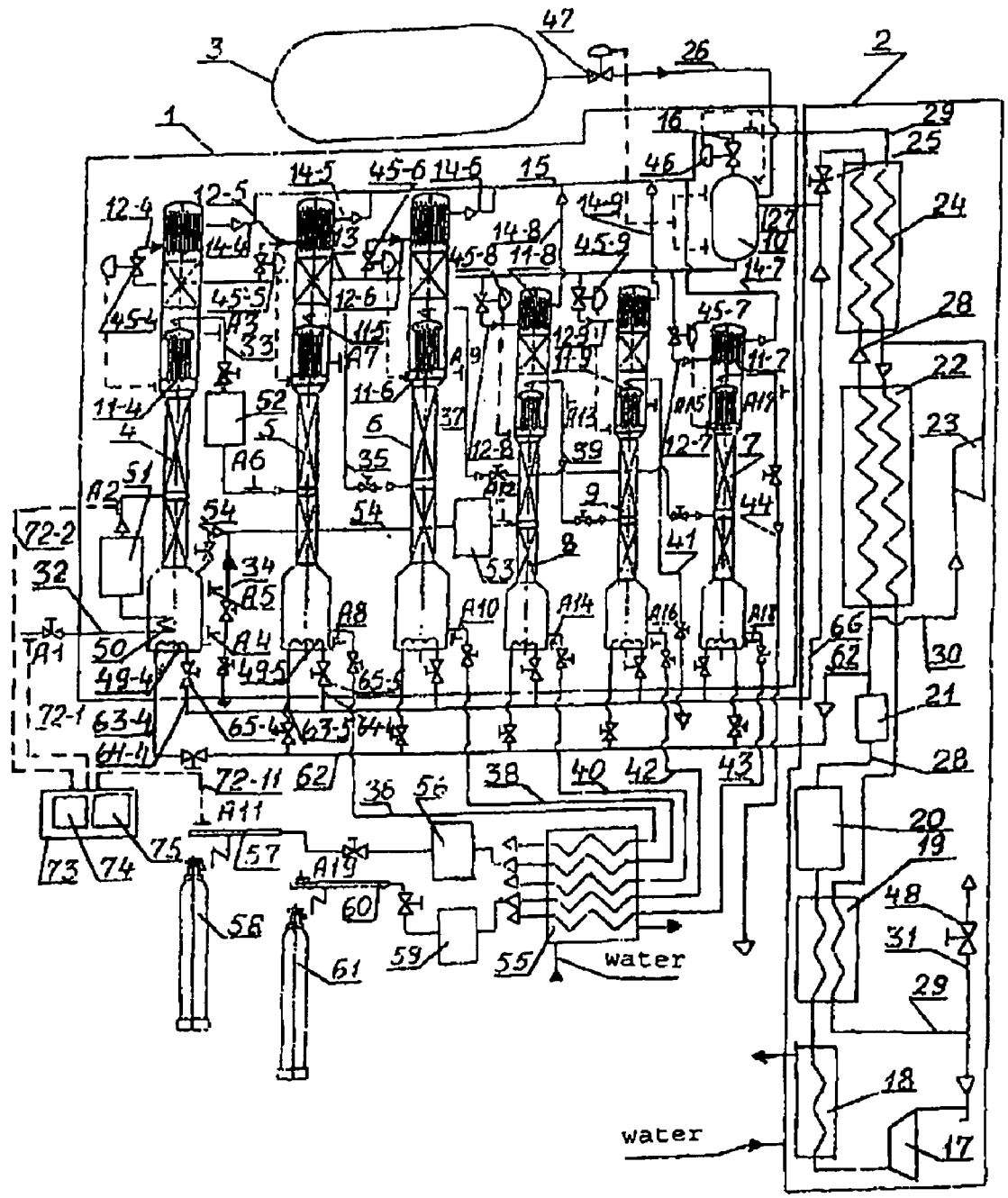
FIG. 1 is a schematic view of an installation of the clearing and separation of a krypton-xenon mixture, according to the present invention.

According to a preferred embodiment, the installation depicted on FIG. 1 comprises a block of low-temperature rectification 1, a cooling cycle 2, a storage for liquid coolant 3, connected by pipelines with armature housing (not shown).

The block of low-temperature rectification includes a column 4 of preliminary separation, an additional rectification column 5 for clearing krypton fractions from radionuclides, a production krypton column 6, a column 7 for retrieval of krypton from low-boiling impurities, an additional rectification column 8 for clearing xenon fractions from radionuclides, a production xenon column 9, a separator 10, connected by pipelines (further called 'lines') with regulative armature. Each of the columns in its lower region has a still furnished with a coil of evaporator 49-4, 49-5, 49-6, 49-7, 49-8, and 49-9, and it has an evaporator-condenser in the head (upper) region Besides, the still of the column 4 of preliminary separation into krypton and xenon fractions comprises a coil of the evaporator warmed by a multi-component mixture incoming for separation.

As shown on FIG. 1, the evaporators-condensers 11-4, 11-5, 11-6, 11-7, 11-8, and 11-9 have branch pipes connected by lines 12-4, 12-5, 12-6, 12-7, 12-8, and 12-9, furnished with regulative valves 45-4, 45-5, 45-6, 45-7, 45-8, and 45-9, with a liquid coolant collector 13, which in turn, is connected with a branch pipe in the bottom part of the separator 10, and the branch pipes connected by the lines 14-4, 14-5, 14-6, 14-7, 14-8, and 14-9 for output of the coolant flows with a collector 15. In the top part, the separator 10 has a branch pipe for output of the coolant flows, connected by a line 16, including a regulative valve 46, with the collector 15, a branch pipe for input of liquid coolant, connected by the line 16, including a regulative valve 47, with the storage 3 of liquid coolant, and a branch pipe for input of the vapor-and-liquid flow of coolant, connected by a line 27 with an exit branch pipe of the cooling cycle 2.

The column 4 in its middle part has a branch pipe, connected by a pipeline through an evaporator 50 with a line 32 of the krypton-xenon mixture flow. An additional apparatus 51 for clearing the mixture from radionuclides is installed on the line 32, for example, along the flowing of mixture after the evaporator 50. In the top part, the column 4 has a branch pipe connected by a line 33 of the krypton fraction flow with a branch pipe in the middle part of the additional rectification column 5.

An additional apparatus 52 for clearing the krypton fraction from radionuclides is installed on the line 33. The still of the column 4 in the top part has a branch pipe connected by a line 54 of the xenon fraction flow, output in the vaporous form, with a branch pipe in the middle part of the additional rectification column 8; and in the bottom part, the still of the column 4 has a branch pipe connected by a line 34 of the flow of the xenon fraction, output in the liquid form, with the line 54. An additional apparatus 53 for clearing the xenon fraction from radionuclides is installed on the line 54.

The additional rectification column 5 in the top part has a branch pipe connected by a line 35 of a cleaned krypton fraction flow with a branch pipe in the middle part of the production krypton column 6, and in the bottom part, i.e. in the still, the column 5 has a branch pipe, connected by a line 36 of the intermediate impurities flow through the evaporator 55 with an output from the installation.

The production krypton column 6 has in its top part a branch pipe connected by a line 37 of an out-blowing gases stream of the production krypton column with a branch pipe in the middle part of the column 7, and in the bottom part, i.e. in the still, the column 6 has a branch pipe connected by a line 38 of the production krypton flow through the evaporator 55 and an apparatus 56 for finish clearing the production krypton with a filling krypton ramp 57 and balloons 58, which balloons are additionally cleaned from radionuclides and certified with respect to the radionuclides content and/or activity.

The column 7 in the top part has a branch pipe connected by a line 44 of the low-boiling impurities flow with the output from the installation, and in the bottom part, i.e. in the still, the column 7 has a branch pipe, connected by a line 43 of the obtained krypton flow through the evaporator 55 with the output from the installation.

The additional rectification column 8 in the top part has a branch pipe connected by a line 39 of a cleaned xenon fraction flow with a branch pipe in the middle part of a production xenon column 9, and in the bottom part, i.e. in the still, the column 8 has a branch pipe, connected by a line 40 of the intermediate impurity flow through the evaporator 55 with the output from the device.

The production xenon column 9 has in its top part a branch pipe connected by a line 41 of an out-blowing gases stream of the production xenon column with the output from the installation, and in the bottom part, i.e. in the still the column 9 has a branch pipe connected by a line 42 of the production xenon flow through the evaporator 55 and an apparatus 56 for finish clearing the production xenon with a filling xenon ramp 60 and balloons 61, in addition cleared from radionuclides and certified with respect to the radionuclides content and/or activity.

The cooling cycle 2 comprises a compressor 17, a terminal refrigerator 18 cooled by water, a preliminary heat exchanger 19, an adsorbent unit 20 of complex cleaning, a filter 21, a basic heat exchanger 22, a gas-expansion machine 23, an additional heat exchanger 24, a throttle device 25, connected by a line 28 of the direct flow, a suction line (a line of the return flow) 29 and a line 30 of the expanded flow. After the filter 21, the line of direct flow 28 is connected by a collector 62 and lines 63-4, 63-5, 63-6, 63-7, 63-8, and 63-9 furnished with locking valves, with the inputs of the coils 46-4, 46-5, 46-6, 46-7, 46-8, and 46-9 of evaporators; at the output of the coils of evaporators, the lines 64-4, 64-5, 64-6, 64-7, 64-8, and 64-9 furnished with throttle devices 65-4, 65-5, 65-6, 65-7, 65-8, and 65-9 and a collector 66, connected to an exit branch pipe of the cooling cycle 2 and further connected by a line 27 with the separator 10.

FIG. 1 shows only the coils of evaporators 49-4, 49-5, the lines 63-4, 63-5, 64-4, 64-5 and throttle devices 65-4, 65-5 relating to the rectification columns 4 and 5. The other columns are similarly arranged.

The rectification columns, the feed lines of the rectification columns, the lines of delivery of the separated products, and the filling ramps are furnished with connecting pipes A1, A2, A3, . . . , A19 and lines 72-1, 72-2, 72-3, . . . 72-19 of environment sampling to devices 73 for control and certification of radionuclides with respect to their content and/or activity, which include devices 74 for measurement of micro-impurities and/or devices 75 for measurement of the activity of radionuclides.

Figure 2:
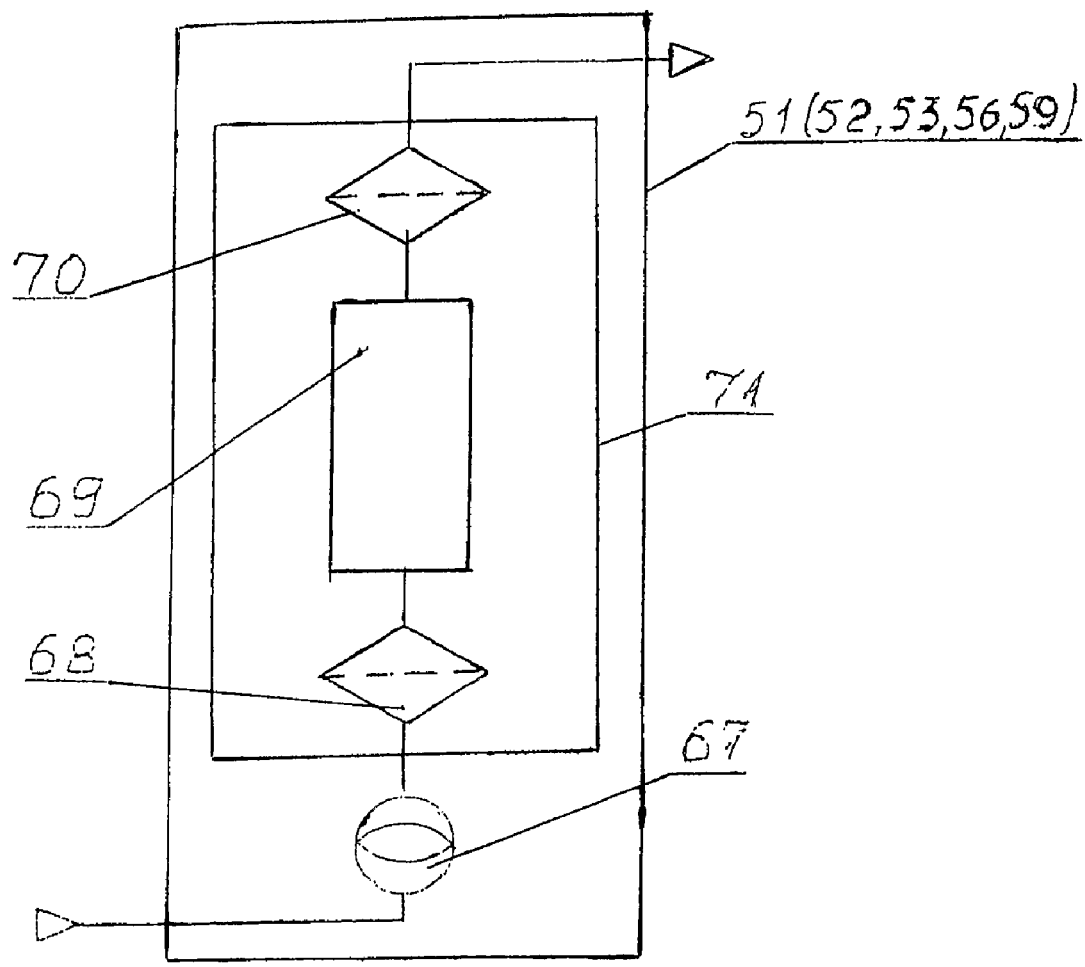
FIG. 2 is a schematic view of an additional apparatus for finish clearing of production krypton and xenon flows from radionuclides, according to the present invention.

The additional apparatus 51 for clearing the mixture from radionuclides, the additional apparatus 52 of cleaning a krypton fraction from radionuclides and the additional device 53 for clearing the xenon fraction from radionuclides, the apparatus 56 for finish clearing the production krypton, and the apparatus 59 for finish clearing the production xenon comprise (FIG. 2) a discharge impeller 67, an entrance filtering element 68, an active cleaning element 69, an exit filtering element 70, and a thermostat system 71.

The claimed method for separation of a krypton-xenon mixture is carried out as follows.

The krypton-xenon mixture is typically produced by air-separating installations, cleaned of the carbohydrates, containing in its structure target components: krypton Kr, xenon Xe, and impurities having greater volatility in relation to krypton (for example, neon Ne, nitrogen $N_2$, oxygen $O_2$), greater volatility in relation to xenon, but lesser volatility in relation to krypton (for example, freon $C_2F_6$), lesser volatility in relation to xenon (for example, carbon dioxide $CO_2$, ethane $C_2H_6$), and also radionuclides (for example, radon Rn and its affiliated products of disintegration).

The mixture is supplied through the line 32, through the evaporator 50 to the additional apparatus 51, and further into the middle part of the column 4. The mixture, passing in a thermostat system 71 through the entrance filtering element 68, the active cleaning element 69, and the exit filtering element 70, is cleaned from radionuclides, reaches a stable state at the moment of processing.

As a result of the rectification process, the xenon fraction containing all xenon, basically less volatile impurities in relation to xenon and heavy radionuclides, and also a small specially maintained quantity of krypton (2-5%) are gathered in the still. In the top part of the column, the krypton fraction is gathered, containing krypton, basically volatile in relation to krypton impurities, and light radionuclides, which krypton fraction is directed along the line 33 through the additional apparatus 52 into the additional rectification column 5. As a result of the rectification process, hard-volatile radionuclides in relation to krypton together with hard-volatile impurities and an insignificant part of krypton are concentrated in the still of the column 5, wherefrom they are output from the installation through the line 36 and through the evaporator 55.

The cleaned krypton fraction flow, already not containing hard-volatile in relation to krypton substances, is deduced from the head of the column 5, and is directed to the production krypton column 6. As a result of the rectification process, krypton is gathered in the still of the column 6, which krypton is directed via the line 33, through the evaporator 55, the apparatus 56 into the filling krypton ramp 57 and into the balloons 58. From the head of the column 6 via the line 37, a flow of gas is deduced, which gas contains krypton and all volatile in relation to krypton impurities, and thereafter is directed into the column 7.

As a result of the rectification process, krypton is gathered in the still of the column 7, which krypton, as accumulated, is deduced through the line 43 and through the evaporator 55, whereas a stream of low-boiling impurities is deduced from the head of the column via the line 44.

The stream of xenon fraction mainly in the form of steam is directed from the still of the column 4 through the line 54, through the additional apparatus 53 into the additional rectification column 8. As a result of the rectification process, hard-volatile radionuclides in relation to krypton together with hard-volatile impurities, and an insignificant part of xenon are concentrated in the still of the column 8, which, as accumulated, are deduced therefrom via the line 40 and through the evaporator 55.

A stream of the cleared xenon fraction, which contains only xenon, is directed into a production xenon column 9 from the head of the column 8 through the line 39. As a result of the rectification process, the production xenon is gathered in the still of the column 9 which production xenon is directed through the line 42, through the evaporator 55, and the apparatus 59 the xenon filling ramp 60 and into the balloons 61; and the stream of gaseous krypton is deduced from the head of the column 9 and directed via the line 44, for example, into a gasholder.

The coolant, for example, liquid nitrogen, from the storage 3, through the line 26, and through the regulative valve 47 is directed into the separator 10, maintaining a preset level of the liquid in the separator 10, and further into the collector 13. The liquid coolant is pumped from the collector 13 into the lines 12-4, 12-5, 12-6, 12-7, 12-8, and 12-9, each of which lines is furnished with regulative valves 45-4, 45-5, 45-6, 45-7, 45-8, and 45-9 respectively, to the boiling surface of the evaporators-condensers 11-4, 11-5, 11-6, 11-7, 11-8, and 11-9. The vapors, being formed during the boiling of coolant, via the lines of removal of coolant vapors 12-4, 12-5, 12-6, 12-7, 12-8, and 12-9, are directed into the collector 15 and further via the line of suction 29 as a return stream through the additional heat exchanger 24, the basic heat exchanger 22, the preliminary heat exchanger 19 are supplied to the inlet of the compressor 17.

The gas, compressed in the compressor 17, is directed to the line 28 of the direct flow, being cooled by water in the terminal refrigerator 18, as a return flow in the preliminary heat exchanger 19, being cleaned from possible impurities in the adsorptive unit of complex cleaning 20 and in the filter 21. After the filter 21, a part of the compressed gas is directed via the line 30 of the gas-expansion flow to the gas-expansion machine 23, wherein it is expanded with the producing of external work, and then it is supplied to the line of the return flow 29 before the core heat exchanger 22. The other part of the compressed flow, after the filter 21, is supplied through the collector 62, via the lines 63-4, 63-5, 63-6, 63-7, 63-8, and 63-9, furnished with locking valves, into the coils of evaporators 49-4, 49-5, 49-6, 49-7, 49-8, and 49-9.

At the output of the evaporators, the cooled flow is expanded via the lines 64-4, 64-5, 64-6, 64-7, 64-8, and 64-9 into the throttle devices 65-4, 65-5, 65-6, 65-7, 65-8, and 65-9, is collected by the collector 66 and, after the throttle device 25, is merged with the remained direct flow, preliminary cooled in the basic 22 and the additional 24 heat exchangers, and expanded in throttle device 25. The so formed two-phase flow, through the line 27, is directed into the separator 10, wherein the coolant vapors, after the separation of the liquid, through the line 16 through the regulative valve 46 are directed to the collector 15, whereas the liquated coolant together with an additional feeding of liquid coolant from the storage 3 is supplied into the evaporators-condensers. The valve 46 provides a pressure difference between the pressures of coolant flows in the separator 10 and the collector 15, necessary for operation of the regulative valves 45-4, 45-5, 45-6, 45-7, 45-8, and 45-9.

The regulative valve 48 mounted on the line 31, maintains the required pressure at the suction inlet of the compressor 17, deducing from the cooling cycle a part of warm gaseous coolant.

At the carrying out of the filtration method of clearing the flow of krypton mixture and/or of a krypton fraction and/or of a xenon fraction, and/or a production flow of krypton, and/or a production flow of xenon from radionuclides, it is meant that the entrance filtering element 68 (FIG. 2) and the exit filtering element 70 are produced of the materials having an equivalent diameter of filtration less than the minimal size aerosols, formed by the corresponding filtered radionuclides.

At the carrying out of the adsorptive method for clearing the stream of krypton mixture and/or of krypton fractions and/or of xenon fractions and/or of production krypton and/or of production xenon from radionuclides, it is meant that the active cleaning element 69 (FIG. 2) in the form of an adsorptive cartridge filled by sorbent, wherein the equivalent size of the pores of the sorbing (adsorptive) substances makes not less than the size of molecules of a corresponding radionuclide, and the temperature of thermostating is maintained not less than the temperature of condensation of a corresponding stream.

At the carrying out of the absorptive method for clearing the stream of krypton mixture and/or krypton fractions and/or xenon fractions and/or a production stream of krypton and/or a production stream of xenon from radionuclides, it is meant that the active cleaning element 69 (FIG. 2) is made in the form of an adsorptive cartridge filled by absorbent, and the temperature of thermostat is maintained not less than the temperature of crystallization of the absorbent.

At the carrying out of the chemical method for cleaning the stream of krypton mixes and/or krypton fractions, and/or xenon fractions, and/or a production stream of krypton, and/or a production stream of xenon from radionuclides, it is meant that the active cleaning element 69 is made in the form of a chemical reactor filled by the catalyst, which provides chemical linkage of a corresponding radionuclide with an oxidizer, being a component of the structure of the catalyst. The temperature of thermostating is preset not less than the temperature of ignition of the oxidation reaction and not exceeding the temperature of the catalyst destruction or the temperature of loss of the dynamic durability of the constructional materials, which the cleaning element is made of.

At the carrying out of the physical-chemical method for cleaning the stream of krypton mixes and/or krypton fractions and/or xenon fractions and/or a production stream of krypton and/or a production stream of xenon from radionuclides, it is meant that the active cleaning element 69 is made in the form of the cartridge filled with an active branched out surface-active surface, for example, with porous titan, porous copper, etc., effecting sedimentation of corresponding radionuclides on the branched out surface of molecules and/or aerosols as a result of interaction of electromagnetic forces.

The above-enumerated methods for cleaning from radionuclides can be used separately or in a combination with each other.

The removal of xenon fraction in the form of the vapors allows reducing the concentration of hardly volatile in relation to xenon impurities contained therein that eventually allows receiving a greater cleanliness of the production xenon.

The cooling of the compressed coolant in the evaporators of the still of the rectification columns allows increasing an output of the liquid coolant from the cooling cycle by 15-20% and, accordingly, to raise production efficiency of the separation processes.

The use of the claimed invention will allow purifying the production krypton and xenon from radionuclides and accomplishing the cleaning and separation of a krypton-xenon mixture in a less expensive manner.

The invention claimed is:

1. A method for purifying and separation a krypton-xenon mixture, comprising the steps of:
    a) providing a preliminary rectification column for preliminary separation of the mixture into krypton and xenon fractions, a column of production krypton, and a column of production xenon, each said column including an evaporator-condenser and a still, each said still including an additional evaporator;
    b) clearing the mixture from radionuclides in an additional apparatus for clearing the mixture from radionuclides;
    c) supplying the mixture into the preliminary rectification column;
    d) purifying said krypton and xenon fractions by rectification to remove volatile and high-boiling components with the formation of a phlegm in said evaporators-condensers of the column of production krypton and the column of production xenon respectively, due to the boiling of liquid coolant coming from a storage and from a cooling cycle;

e) clearing the flows of said krypton and xenon fractions from radionuclides correspondingly at an additional apparatus for clearing the krypton fraction from radionuclides and at an additional apparatus for clearing the xenon fraction from radionuclides with the control over content and/or activity of radionuclides therein;

f) removing the xenon fraction from the still of said preliminary separation column;

g) clearing the flows of production krypton and xenon from radionuclides correspondingly in an additional apparatus for finish clearing of the production krypton and in an additional apparatus for finish clearing of the production xenon;

h) passing the production flows of krypton and xenon onto filling ramps;

i) pumping the production flows of krypton and xenon into balloons;

j) additionally testing the flows on the radionuclides content and/or activity;

k) retrieving compressed coolant from the cooling cycle;

l) cooling off the compressed coolant in the additional evaporators of said stills of said preliminary rectification column, said column of production krypton, and said column of production xenon; and m) returning the coolant into the cooling cycle.

2. The method according to claim 1, wherein the step (e) is carried out by means of a rectification method, and said additional apparatuses are thermostated.

3. The method according to claim 2, wherein the balloons are additionally cleaned from radionuclides and certified with respect to radionuclides content and/or activity before the step (i).

4. The method according to claim 1, wherein the balloons are additionally cleaned from radionuclides and certified with respect to radionuclides content and/or activity before the step (i).

5. The method according to claim 1, wherein the step (b) and the step (g) are carried out by means of filtration and/or adsorption and/or absorption and/or chemical and/or physicochemical methods, and said additional apparatuses are thermostated.

6. An installation for purifying and separation a krypton-xenon mixture comprising:

a feed line for supplying the mixture;

a cooling cycle;

an additional apparatus for cleaning the mixture with a thermostat system mounted on the feed line;

a column of preliminary separation of the mixture into krypton and xenon fractions connected to the feed line, said column of preliminary separation in its upper region including an evaporator-condenser connected to the cooling cycle by means of pipelines and valves, and in its lower region including a still furnished with an additional evaporator therein connected to the cooling cycle and with an additional line of retrieval of the xenon fraction in the vapor form;

a production krypton column, connected to the preliminary separation column via a krypton fraction line, the production krypton column including in its upper region condensers-evaporators connected to the cooling cycle by means of pipelines and valves and in its lower region including a still furnished with an additional evaporator connected to the cooling cycle;

a production xenon column, connected to the preliminary separation column via a xenon fraction line, the production xenon column including in its upper region condensers-evaporators connected to the cooling cycle by means of pipelines and valves, and in its lower region including a still furnished with an additional evaporator connected to the cooling cycle;

an additional apparatus for cleaning the krypton fraction from radionuclides and/or an additional rectification column for cleaning the krypton fraction from radionuclides mounted on the krypton fraction line before the krypton production column;

an additional apparatus for cleaning the xenon fraction from radionuclides and/or an additional rectification column for cleaning the xenon fraction from radionuclides mounted on the xenon fraction line before the xenon production column;

production lines of flows of the production krypton and xenon with krypton and xenon filling ramps respectively mounted on said production lines, said production lines associated with the stills of said production krypton column and said production xenon column correspondingly;

an apparatus for finish clearing the production krypton and an apparatus for finish clearing the production xenon respectively mounted on said production lines of flows of the production krypton and the production xenon before the filling ramps; and the preliminary and production columns, the lines of production flows of krypton and xenon with filling ramps are additionally furnished with control units and units for testing the radionuclides content and/or activity.

7. The installation according to claim 6, wherein said apparatus for finish clearing the production krypton and said apparatus for finish clearing the production xenon comprise subsequently placed a discharge impeller, an entrance filtering element, an active cleaning element, and an exit filtering element.

* * * * *